June 30, 1936.  E. W. ELY ET AL  2,046,111
SPEEDOMETER DEMAGNETIZER
Filed March 5, 1934   2 Sheets-Sheet 1
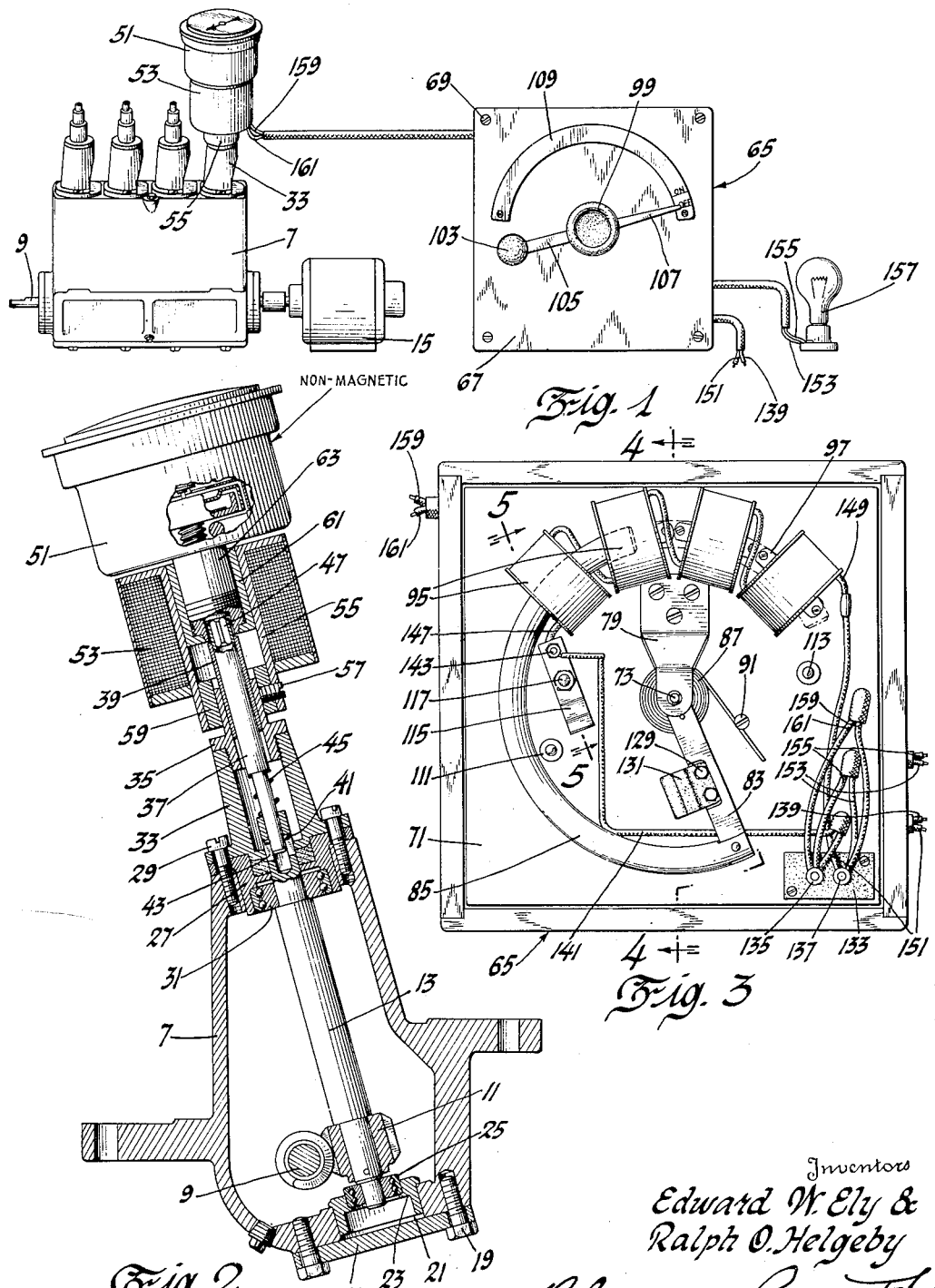

June 30, 1936.  E. W. ELY ET AL  2,046,111

SPEEDOMETER DEMAGNETIZER

Filed March 5, 1934  2 Sheets-Sheet 2

Inventors
Edward W. Ely &
Ralph O. Helgeby
By Blackmore, Spencer & Hurd
Attorneys Patented June 30, 1936

2,046,111

UNITED STATES PATENT OFFICE 2,046,111

SPEEDOMETER DEMAGNETIZER

Edward W. Ely and Ralph O. Helgeby, Flint, Mich., assignors to General Motors Corporation, Detroit, Mich., a corporation of Delaware Application March 5, 1934, Serial No. 713,978

13 Claims. (Cl. 175—183)

This invention relates to the manufacture of magnetic measuring instruments and particularly to the procedure of calibrating the magnet of such an instrument after assembly of its parts. The invention has in view especially the calibration of the magnet of a vehicle speedometer although its utility is in no wise limited to such instruments.

In its broader aspects the invention is concerned with a preliminary overcharging of the magnet of such an assembled instrument, preferably to saturation, as by the use of a direct current, and thereafter with a demagnetizing of the overcharged magnet by subjecting the same to the influence of the magnetic field of a demagnetizing coil through which an alternating current is being passed. This demagnetizing treatment takes the place of the long aging process once thought necessary to secure the permanency of the magnet and is an improvement over the cut and try demagnetizing process recently used and employing a hand-operated alternating current demagnetizer.

The object of the invention is the performance of the demagnetizing of the magnet of the assembled instrument with a saving of time; with greater uniformity of results; without reliance upon the skill of the operator; and by a mechanism which adapts itself to the degree of magnetization.

Other objects and advantages will be understood from the following description.

In the accompanying drawings:

Fig. 1 is a diagrammatic view of the parts of the novel apparatus.

Fig. 2 is a view in vertical section of one part of the apparatus.

Fig. 3 is a top plan view of another part with its cover removed.

Figure 4:
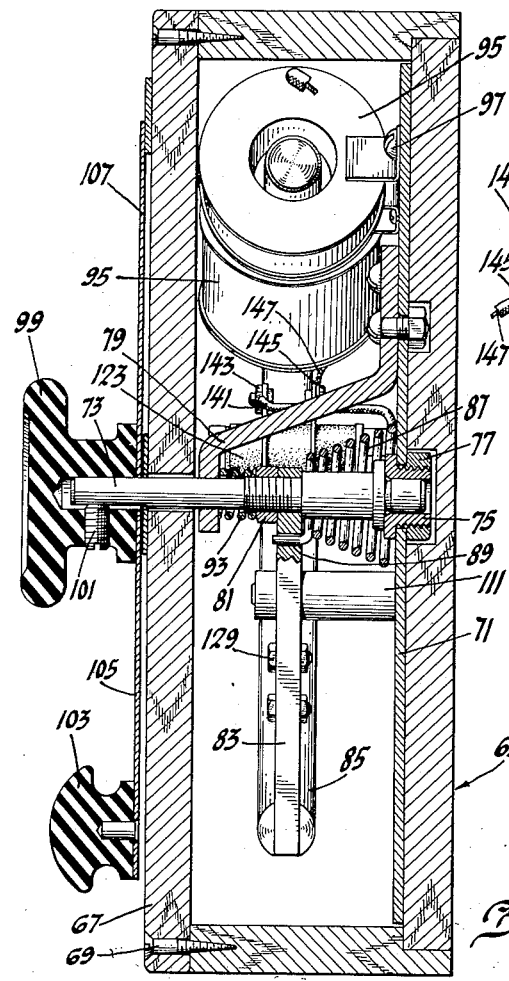
Fig. 4 is a section on line 4—4 of Fig. 3.

Referring by reference characters to the several figures of the drawings, numeral 7 is what may be called a calibrating machine. Its shaft 9 is coupled by gearing with a plurality of spindles, gearing 11 and spindle 13 being illustrative. Fig. 1 shows that there may be four such spindles. The gear ratios will be such that the spindles rotate at different speeds. It may be assumed that spindle 13 is driven at a rate corresponding to the driving member of a vehicle speedometer when the vehicle is traveling at sixty miles an hour. A speedometer having its rotor shaft coupled to spindle 13 should read sixty miles per hour if correctly calibrated. The other spindles should be driven at lower speeds. The readings of the speedometer needle should conform to the predetermined rate of rotation of the spindle to which the instrument is coupled. Shaft 9 is driven by a suitable motor 15. Cover means 17 is secured by fastening means 19. This cover closes openings such as 21 in the bottom of casting 7. The opening 21 receives a cupped holder 23 for a bearing 25 rotatably supporting the reduced lower end of spindle 13. Upper closures 27 secured by fastening means 29 at the top of the machine 7 are provided, one for each spindle. The closure 27 carries upper spindle bearing 31, the bearing having its inner and outer races in engagement with shoulders on the spindle and closure as shown. Fastening means 29 also serve to secure a hollow conical member 33 into the top of which is threaded a cap 35. A shaft 37 extends through the cap 35, being journaled in an upwardly extending sleeve 39. The reduced end of shaft 37 extends down through conical member 33 and is axially slidable within a suitable opening in the end of shaft 13. It is held from rotation relative to shaft 13 by a key 41 extending diametrically through shaft 37 and through a slot 43 in shaft 13. A spring 45 engages the extremity of shaft 13, surrounds shaft 37, and engages a shoulder thereon to resiliently project shaft 37 upwardly. The upper end of shaft 37 is recessed axially to receive the conventional non-circular end 47 of the rotor shaft of a speedometer. Such a speedometer is shown housed in a non-magnetic casing 51, its wall being partly broken away to show operating mechanism forming no part of this invention and which need not be described. In the case of spindle 13 only, there is a demagnetizing coil 53 secured to the upper end of cap 35 and in coaxial relation to the shaft 37 and the rotor shaft of the speedometer. This coil 53 is carried on a spool 55 within one extended end of which is fitted a ring 59. Fastening means 57 pass through the spool extension and through ring 59 to secure the spool to the cap 35. A cup 61 is fitted down into the upper end of the spool to receive the stem 63 of the speedometer. The bottom of the cup is apertured and the end 47 of the rotor shaft projects through this aperture into driving engagement with shaft 37. When the instrument is assembled with its stem in cup 61 and with rotor shaft end 47 engaged with shaft 37, pressure on the instrument acts against spring 45 to ensure driving engagement.

A control box which may be made of wood is designated by numeral 65. The box has a top cover 67 secured by screws 69. A bottom plate 71 of brass or other non-magnetic material supports the contents of the box. A shaft 73 is journaled in a bearing 75 passed through an opening in this brass plate and into a suitable recess in the wooden bottom of the box. To the stem of the bearing 75 beneath the plate 71 is threaded a securing nut 77. A second shaft bearing is formed in a clamp 79, also secured as shown to the bottom plate 71. Between a shoulder on shaft 73 and a nut 81 threaded on the shaft is clamped an arm 83 carrying a semi-circular iron choke bar. A torsion spring 87 surrounds the shaft 73 and is anchored to the arm as at 89 and to the plate 71 as at 91. A spring 93 holds down the assembly by abutment with the fixed clamp 79 and the nut 81.

The choke bar 85 passes through one or more coils 95, four being shown, which coils are arranged in arcuate fashion to receive the choke bar and are separately secured by fastening means 97. A knob 99 is fastened to shaft 73 outside cover 67 by a set screw 101 whereby rotation of shaft 73 with the arm and choke bar may be effected. This rotation may also be made by a lever arm 105 having a handle 103, the lever arm being keyed to the shaft. The lever arm may be extended diametrically to form a pointer 107 movable over a scale 109.

The oscillating motion caused by moving the handle (or knob) is limited by insulated stops 111 and 113. The shaft is rotated in one direction by the spring 87, this direction of rotation causing the choke bar to move through the several coils 95 and finally this rotation is stopped by the engagement of the arm 83 with stop 111. Manual operation reverses the direction of rotation with the withdrawal of the choke bar from the coils one by one, the motion being limited by stop 113.

Figure 5:
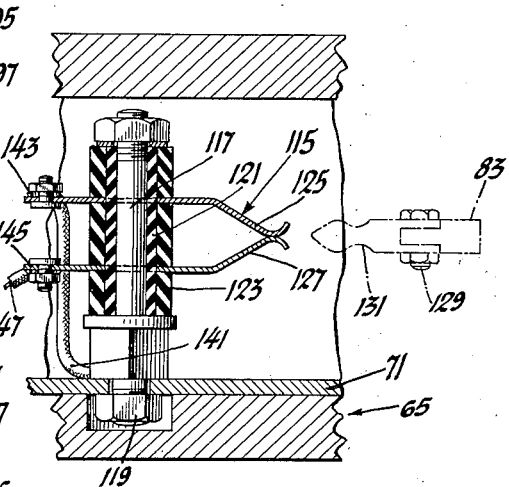
Fig. 5 is a section on line 5—5 of Fig. 3.

A switch 115 is secured to a post 117 as best shown by Fig. 5. The post is secured by a nut 119 to bottom plate 71 and suitable insulating elements 121 and 123 are assembled about the post as shown. These elements 121 and 123 space the switch plates 125 and 127 from post 117 and from each other. To the arm 83 is secured by fastening means 129 a circuit breaker 131 of insulating material. Just as the arm 83 is being brought into contact with stop 111 the circuit breaker opens the switch, the pointer then indicating "off" on the scale shown in Fig. 1.

Figure 6:
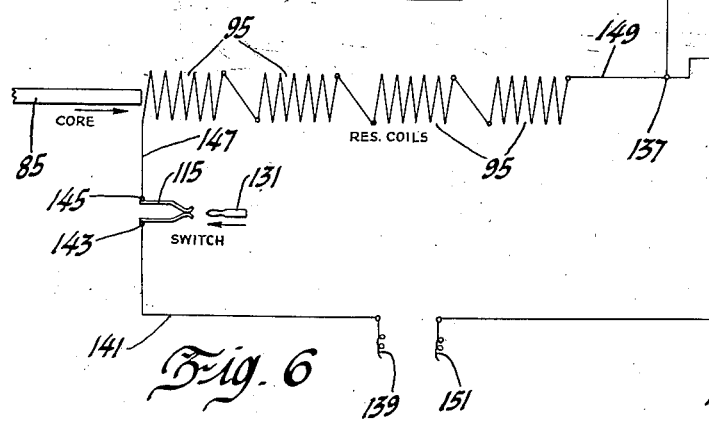
Fig. 6 is a diagram of the electric circuit.

A terminal block 133 is secured to the plate 71 as shown in Fig. 3. It has posts 135 and 137. Lead wires from an alternating current source are shown at 139 and 151. Wire 139 is continued as at 141 to switch connection 143. From switch connection 145 a wire 147 extends to the first coil 95. The several coils 95 are connected in series. From the last coil a wire 149 extends to post 137. One circuit including wires 153 and 155 connects post 137 and 135 through a lamp resistance 157. A second parallel circuit including wires 159 and 161 connects posts 137 and 135 through the demagnetizing coil 53. The alternating current lead wire 151 is connected to post 135. It will therefore be seen that input lead 139 is continued through the switch and the several coils 95 to post 137, whereupon the current divides one part illuminating the lamp 157 and the other energizing the demagnetizing coil 53. This is illustrated in Fig. 6.

It will be understood that when the knob or handle is released the spring 87 rotates the core 85 clockwise through the several coils and, finally, just as the arm 83 approaches the stop 111 the circuit breaker opens the switch 115. At this moment the pointer indicates the circuit is open by pointing to the word "off". Prior to the use of the mechanism the instrument will be assembled and its magnet overcharged preferably to saturation by a direct current. The instrument is then assembled as in Fig. 2 where the sixty miles per hour spindle 13 is in driving connection with the rotor shaft of the speedometer. When the motor 15 is operated the shaft 13 is driven at a rate such that a correctly calibrated speedometer pointer would read 60 but, owing to the overcharge of the magnet of the instrument, it will read 75 or 80. An alternating current through coil 53 is to reduce the magnetism of the magnet to a point where the instrument reads 60. To that end handle 103 is slowly moved in a counterclockwise direction. When the pointer 107 reaches the "on" position the circuit breaker leaves the switch 115 and a current passes through the coils 95, and also through the parallel circuits including the demagnetizing coil and lamp resistance. At the moment of switch closing there is but little current flow through the demagnetizing coil. This is due to the impedance of the whole system which results from the self-inductance phenomenon which takes place between the coils and choke bar and is also caused by the resistance offered by the lamp. The alternating current produces in each coil a magnetic field which causes the choke bar to be magnetized and demagnetized sixty times per second, thus creating a load upon each coil. The total load placed on the circuit varies with the number of coils acting on the choke bar. It also depends upon the variable resistance obtained by the bulb which causes a corresponding current drop. As the handle continues to be moved slowly (counterclockwise as in Figs. 1 and 3) the choke bar leaves one coil after another, thereby lessening the impedance and increasing the current flow through the demagnetizing coil and through the lamp. The gradual increase of current flow through the demagnetizing coil increases the efficiency of the latter coil in reducing the magnetism of the magnet of the instrument. When the magnetism of the magnet is reduced to a point where the reading of the instrument is 60, the choke bar is released to the action of the spring 87 which causes it to be returned to its initial position and the circuit to be opened at the switch. The use of the lamp as a supplementary resistance rather than of a fixed resistance is preferred for the reason that lamp bulbs of varying resistance may be interchangeably used and because of the fact that the lamp bulb forms a variable resistance increasing and decreasing with the temperature changes of the filament.

The mechanism for manually withdrawing the choke bar through the circular arrangement of coils provides a most accurate way for effecting gradual current changes and avoiding any jerky operation. It also avoids long travel such as would be necessary were the coils 95 arranged in axial alignment. By the use of several coils instead of one, better cooling is obtained, and manufacture is simplified. The current drop obtained by the coils and reciprocable core is more uniform than could be otherwise obtained and has the further advantage over a rheostat in that there are practically no parts subject to wear and requiring replacement or repair.

As stated above, the speedometer being calibrated is housed within a non-magnetic casing 51. It may be well to explain that in the event of a speedometer which is to be mounted in a magnetic casing the calibration is performed before assembly in the casing. Otherwise the casing would act as a shield and prevent demagnetization.

We claim:

1. Apparatus for calibrating a tachometer containing an overcharged magnet and a mechanically driven rotor shaft, said apparatus comprising a motor driven machine having a shaft for rotation at a predetermined rate, means constituting an A. C. electric circuit and including a demagnetizing coil mounted adjacent said machine shaft, means whereby said tachometer is mounted upon said machine with its magnet adjacent said demagnetizing coil and whereby the machine shaft may be connected to said rotor shaft, said circuit also including one or more other coils and a choke bar reciprocable through said other coils.

2. Apparatus to calibrate a tachometer containing an overcharged magnet and a rotor shaft, said shaft adapted to be mechanically driven, said apparatus comprising means to rotate said rotor shaft at a predetermined rate, means constituting an alternating current circuit comprising a demagnetizing coil adjacent said overcharged magnet, a control box having a plurality of coils arranged in circular relation and connected in series with each other and with said demagnetizing coil, an arcuate choke bar, a radial arm rotatably mounted about the center of said other coils, said choke bar secured to said radial arm, yielding means to project said choke bar through said other coils, a switch in said circuit, a circuit breaker secured to said arm and operable to open said switch when the choke bar is projected through said other coils, and means to open said switch and withdraw said choke bar from said other coils against the tension of said yielding means.

3. The invention defined by claim 2, said last-named means being a lever arm outside said control box and a manually operable handle on said lever arm.

4. For use in calibrating a tachometer having an overcharged magnet and a rotor shaft, a machine having a main shaft, a plurality of shafts driven thereby at predetermined rates, said driven shafts being terminally constructed to be engaged by and to drive the rotor shaft of the measuring instruments, mechanism constituting an alternating current circuit including a demagnetizing coil adjacent one of said plurality of driven shafts and also including a plurality of other coils, and a choke bar movably mounted to extend through or be removed from said other coils.

5. The invention defined by claim 4 together with yielding means to project said choke bar into said other coils and manually operable means to withdraw said choke bar from said other coils.

6. The invention defined by claim 4 together with a fixed switch, and a circuit breaker carried by said choke bar and yielding means to project said choke bar through said other coils and open said switch.

7. The invention defined by claim 4 together with resistance constituting a lamp bulb connected in parallel with the demagnetizing coil.

8. The invention defined by claim 4, said plurality of other coils and said choke bar being of arcuate formation and concentric relation, a fixed switch, and a circuit breaker carried by said choke bar to open said switch when the choke bar is within said other coils.

9. For use in calibrating a tachometer having a rotor and a magnet, mechanical means to drive the rotor at a predetermined rate of rotation, and means to vary the magnetism of the magnet while the rotor is being driven.

10. The invention defined by claim 9, said last-named means including mechanism located adjacent the magnet and carrying an alternating current, and manually operable means to control the current through said mechanism.

11. A magnetic calibrator comprising a holder for an instrument to be calibrated, a demagnetizing coil mounted adjacent thereto, an A. C. circuit including said demagnetizing coil and a choke coil in series therewith, a reciprocable core for said choke coil, manually operable means for reciprocating said core within said choke coil, and a switch in said circuit opened by reciprocation of the core to its point farthest within said choke coil.

12. The invention set forth in claim 11 together with a lamp bulb arranged in parallel with said demagnetizing coil.

13. The invention set forth in claim 11 together with a spring for projecting said core into said choke coil and opening said switch.

EDWARD W. ELY.
RALPH O. HELGEBY.